No. 794,044. PATENTED JULY 4, 1905.
C. A. PAISLEY.
WRENCH.
APPLICATION FILED FEB. 28, 1905.
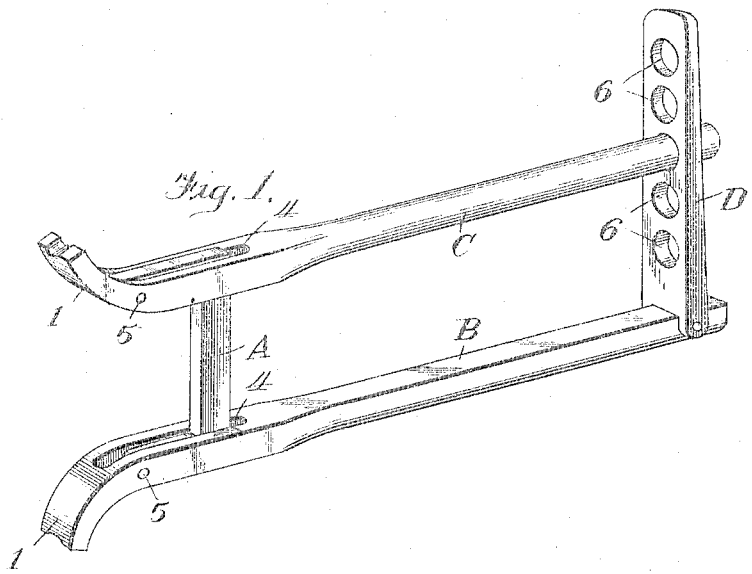
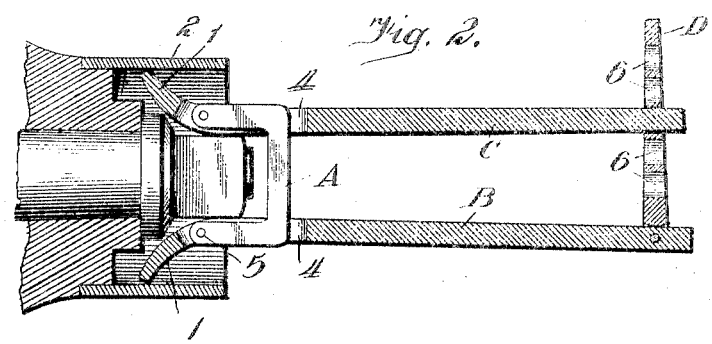
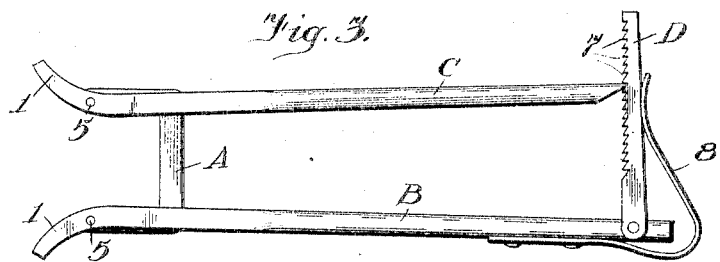
Witnesses
Milton T. Lenour.
Watts T. Estabrook
Inventor
Carlton A. Paisley
by Thos. G. DuBois
Lia Attorneys No. 794,044. Patented July 4, 1905.

UNITED STATES PATENT OFFICE.

CARLTON A. PAISLEY, OF WINFIELD, IOWA.

WRENCH.

SPECIFICATION forming part of Letters Patent No. 794,044, dated July 4, 1905.

Application filed February 28, 1905. Serial No. 247,731.

*To all whom it may concern:*

Be it known that I, CARLTON A. PAISLEY, a citizen of the United States, residing at Winfield, in the county of Henry and State of Iowa, have invented certain new and useful Improvements in Wrenches, of which the following is a specification.

My invention relates to an improvement in wrenches especially adapted for the purpose of taking off and putting on carriage and buggy wheels and wheels similarly used for light vehicles and the like; and the object is to provide a wrench of such construction and adaptation that the wheel may be removed and replaced without soiling the hands, as the nut does not have to be touched, and without any danger of the nut dropping and rolling on the ground and gathering dirt and grit, greatly to the annoyance and inconvenience of the person oiling the vehicle, as well as to the injury and detriment of the parts.

A further object is to provide a device which will fasten the nut to the wheel in the proper relation to the axle so that when the wheel is returned to its position the nut is returned to the threaded end of the axle.

With these several objects in view my invention consists in certain novel features of construction and combinations of parts, which will be hereinafter described, and pointed out in the claims.

In the accompanying drawings, Figure 1 is a view in perspective of my improved wrench. Fig. 2 is a sectional view showing it applied, and Fig. 3 is a modification.

A represents a spanner, preferably U-shaped, in side elevation, it being of a size to span and receive the ordinary nut of a carriage, buggy, or light vehicle.

B and C are two hand-levers, the inner ends of which are curved outwardly in opposite directions to form jaws 1 1, adapted to engage the inner surface of the hub-band 2 of the wheel. These levers are provided with slots 4 4, adapted to receive the spanner A and fit the same, the ends of the spanner being pivoted at the forward ends of the slots, as at 5 5. Lever B has a locking-bar D pivoted thereto. This locking-bar may be differently constructed. In Fig. 2 I have shown it with holes 6 6 therein to receive and lock the end of lever C, whereas in Fig. 3 in lieu of the perforated locking-bar I have shown a ratchet-toothed bar 7, adapted to be held in position by a spring 8, and the end of lever C has a sharp point adapted to be engaged by the said teeth when the parts are locked in position.

The device is applied by first swinging the locking-bar back out of the way and then inserting the ends of the jaws into the hub-band with the spanner embracing the nut. The hand-levers are then swung together toward each other until the hub-band is securely clamped by them, when the locking-bar is made to engage hand-lever C, and the two hand-levers are held fast together, in this way locking the nut securely to the hub. The wheel may be raised by the ordinary lifting-jack or otherwise before or after applying the wrench, and after the wrench is applied and the wheel raised from the ground the operator turns the wheel, unscrewing the nut with the turning of the wheel, whereupon the nut, wheel, and wrench come off as a single piece, all three being rigidly secured together. After the axle is oiled or greased by turning the wheel in the opposite direction on the axle the nut is screwed back on and the wrench is removed. In this way the operator never has to touch the nut, there is no danger of the nut dropping to or rolling upon the ground, and its position relative to the hub and axle is always absolutely insured.

The device is simple, easy to apply, and effectual in performing its functions, and is quick in operation, greatly reducing the loss of time and inconvenience experienced in oiling a vehicle.

Slight changes might be resorted to in the form and arrangement of the several parts described without departing from the spirit and scope of my invention, and hence I do not wish to limit myself to the exact constructions herein set forth; but, Having fully described my invention, what

I claim as new, and desire to secure by Letters Patent, is—

1. As an article of manufacture, a wrench comprising a spanner adapted to receive and loosely embrace a hub-nut, and levers pivoted to the spanner and constructed to engage the nut and hub when pressed toward each other at their outer or free ends.

2. As an article of manufacture, a wrench comprising a U-shaped spanner adapted to receive and loosely embrace a hub-nut, and levers pivoted to the ends of the spanner and constructed to engage the nut and hub when pressed toward each other at their outer or free ends.

3. As an article of manufacture, a wrench comprising a U-shaped spanner adapted to receive and loosely embrace a hub-nut, and levers pivoted to the ends of the spanner and constructed to engage the nut and hub when pressed toward each other at their outer or free ends, and means for locking them together at their outer ends.

4. As an article of manufacture, a wrench comprising a U-shaped spanner and hand-levers curved at their inner ends and pivoted at the ends of the spanner at some point between the ends of the curved portions of the levers whereby one end of the curved portions of the levers is forced inwardly when the opposite end is forced in the opposite direction.

In testimony whereof I have affixed my signature in presence of two witnesses.

CARLTON A. PAISLEY.

Witnesses:
C. C. WILSON,
A. S. FOLGER.